United States Patent [19]

Kishida et al.

[11] 4,368,283

[45] Jan. 11, 1983

[54] REINFORCED RESIN COMPOSITION

[75] Inventors: Kazuo Kishida; Isao Sasaki; Hiroshi Mori, all of Ohtake, Japan

[73] Assignee: Mitsubishi Rayon Co., Ltd., Tokyo, Japan

[21] Appl. No.: 279,016

[22] Filed: Jun. 30, 1981

[30] Foreign Application Priority Data

Jul. 15, 1980 [JP] Japan .................................. 55-96355

[51] Int. Cl.³ ............................................... C08K 5/15
[52] U.S. Cl. ..................................... 524/109; 524/110; 524/111; 524/487; 524/489; 524/490; 524/494
[58] Field of Search ................. 260/40 R, 28 R, 22 R, 260/22 A, 31.2 XA, 31.6, 31.4 R; 524/109, 110, 111, 487, 489, 490, 494

[56] References Cited

U.S. PATENT DOCUMENTS 4,247,427  1/1981  Edinger ............................. 260/22 R
4,280,005  7/1981  Fox .................................... 260/40 R

*Primary Examiner*—Melvyn I. Marquis

*Attorney, Agent, or Firm*—Cushman, Darby & Cushman

[57] ABSTRACT

Reinforced resin compositions exhibiting excellent heat resistance and appearance, and containing by weight: (a) at least 30% of a polyethylene terephthalate-type resin, (b) 5 to 60% glass fiber, (c) 0.03 to 5% of one or more salts of organic carboxylic acids with metals of the Groups Ia and IIa of the Periodic Table, and (d) 0.1 to 20% of a sorbitan derivative are disclosed. Optionally liquid or solid paraffin or polyethylene wax is incorporated in an amount of 0.3 to 5% based on the total composition may be incorporated if a white article is desired.

Molded articles prepared from these compositions, high in heat resistance and uniform appearance, even if the thickness of the molded article is small or uneven or the molding operation is carried out at a relatively low mold temperature, are also disclosed. Molding temperature dependence and thickness dependence on the heat distortion temperature of the molded article are remarkably improved as well.

12 Claims, No Drawings

REINFORCED RESIN COMPOSITION

BACKGROUND OF THE INVENTION

1. Field of the Invention

The present invention relates to reinforced resin compositions containing as a main component a polyethylene terephthalate-type resin; the compositions have excellent heat resistance and uniform appearance.

2. Description of the Prior Art

Glass fiber-reinforced polyethylene terephthalate resins have been used widely for their excellent mechanical properties and chemical resistance. However, products obtained by molding these glass fiber-reinforced resins at mold temperatures lower than 100° C. have a heat distortion temperature of about 100° C. and are poor in the heat resistance. Furthermore, when molded articles of uneven thickness are prepared from these reinforced resins, the thin portion tends to be semi-transparent and the thick portion white only in the interior. The thus obtained molded articles are nonuniform in appearance and are not preferred from the aesthetic viewpoint. On the other hand, molded articles obtained by elevating the mold temperature to a level higher than about 120° C. have a heat distortion temperature of about 230° C., and even molded articles having a thin portion have a white uniform appearance with excellent luster. Therefore, when high heat resistance and uniform appearance are required, the molding operation is ordinarily carried out at a high mold temperature of 130° C. to 150° C., however a high-temperature mold is costly to operate and as such represents a serious disadvantage.

Recently, additives capable of improving the heat resistance of polyethylene terephthalate resins, such as metal salts of organic carboxylic acids and inorganic compounds, have been used. When incorporated these additives allow for some improvement in heat resistance, molding temperature dependency and appearance of the articles. More specifically, even if a polyethylene terephthalate resin composition containing such additives is molded at a low mold temperature, the degree of whitening in the thick portion of the molded article is increased and the heat resistance is also improved to some extent. However, when a thin molded article containing an additive such as a metal salt of an organic carboxylic acid or an inorganic compound is prepared according to this method, if the mold temperature is low, the heat resistance of the molded article obtained is still poor, the article is semi-transparent or the interior thereof is slightly whitened. The appearance is not uniform. Especially in case of a molded article which is of uneven thickness, since the appearance of the thin portion is different from that of the thick portion, the thus molded article is visually nonuniform in appearance and as such is rather aesthetically inferior.

SUMMARY OF THE INVENTION

We have developed and hereby disclose resin compositions capable of providing a molded article with excellent heat resistance and a relatively uniform appearance while substantially improving the molding temperature dependency and thickness dependency of the heat distortion temperature even when such compositions are molded at a relatively low mold temperature. Consequently we have found that when specific amounts of a specific metal salt of an organic carboxylic acid and a specific sorbitan derivative are incorporated into a glass fiber-reinforced polyethylene terephthalate resin, these and other objects can be achieved. Further, when a specific amount of a liquid or solid paraffin or a polyethylene wax or mixtures thereof are incorporated into a resin composition containing the four above-listed components, the resulting resin product is a fully uniform, even, white, heat-resistant molding.

In accordance with the first fundamental aspect of the present invention, a reinforced resin composition excellent in heat resistance and appearance is provided, the composition comprising: (a) at least 30% by weight of a polyethylene terephthalate-type resin, (b) 5 to 60% by weight of glass fiber, (c) 0.03 to 5% by weight of one or more salts of organic carboxylic acids with metals of the Groups I-a and II-a of the Periodic Table, and (d) 0.1 to 20% by weight of one or more sorbitan derivatives, the total amount of the components (a) through (d) being 100% by weight.

In accordance with the second fundamental aspect of the present invention, a white, uniform reinforced resin composition excellent in heat resistance and appearance, is provided, the composition comprising: (a) at least 30% by weight of a polyethylene terephthalate-type resin, (b) 5 to 60% by weight of glass fiber, (c) 0.03 to 5% by weight of one or more salts of an organic carboxylic acid with metals of the Groups Ia and IIa of the Periodic Table, (d) 0.1 to 20% by weight of one or more sorbitan derivatives and (e) 0.3 to 5% by weight of one or more of liquid paraffin, solid paraffin or polyethylene wax, the total amount of the components (a) through (e) being 100% by weight.

When a molded article uneven in thickness is molded at a low mold temperature from a glass fiber-reinforced polyethylene terephthalate-type resin composition containing components (a) through (c), the thin portion of the molding appears transparent or semi-transparent while the interior of the thick portion appears white and the edge portion is transparent. In short, the appearance of the molded article is uneven. By contrast, if one molds the reinforced resin composition containing specific amounts of components (a) through (d) according to the first fundamental aspect of the present invention at a low mold temperature, one obtains a molded article of an irregular thickness, the visual appearance is significantly improved, the molded article having a uniform appearance in not only the thin portion but in the thick portion as well. Further the (a)-(d) composition is advantageous in that it can be molded into an article excellent in heat resistance where the molding temperature dependency and thickness dependency of the heat distortion temperature are substantially improved.

According to a second aspect of the invention, when the reinforced resin composition further contains a specific amount of the component (e) this molding composition can be formed into a molded article having an excellent white uniform appearance. More specifically, even if the reinforced resin composition containing components (a) through (d) and (a) through (e) are molded at a low mold temperature, the heat distortion temperature of the resulting molded article is comparable to that of a molded article obtained by carrying out the molding operation at a high mold temperature of 130° to 150° C.

The present invention will now be described in more detail in the following non-limiting examples. Unless otherwise indicated all parts and percentages are by weight.

DETAILED DESCRIPTION OF THE INVENTION

The polyethylene terephthalate-type resin for component (a) used in the present invention includes a linear ethylene terephthalate homopolymer comprising ethylene terephthalate units as structural units, a copolymer of ethylene terephthalate with a small amount of other monomer copolymerizable therewith, or a blend of such homopolymer and copolymer. As the polyethylene terephthalate type resin, one may use not only a polymer obtained according to a method in which ester exchange reaction is first conducted and polycondensation is then carried out, but also a polymer obtained in which direct esterification is first conducted and polycondensation is then carried out. It is ordinarily preferred that the intrinsic viscosity [η] of the polymer used be in the range of from 0.4 to 1.4.

A polymer having a high intrinsic viscosity [η] can be obtained by subjecting a polymer obtained by the above polymerization method to solid phase polymerization according to known procedures. In these measurements the intrinsic viscosity [η] value is calculated from a solution viscosity measured at 25° C. in a 50/50 (weight ratio) mixed solvent of phenol and tetrachloroethane. Suitable polyethylene terephthalate-type resins useful in the compositions of the present invention are available in commerce.

The polyethylene terephthalate-type resin (a) used in the present invention is incorporated in an amount of at least 30% by weight based on the total composition. If the amount of the component (a) is less than 30% by weight, the flow processability is degraded and good results are not obtained.

In the present invention, the glass fiber (b) is used in an amount of 5 to 60% by weight based on the total composition. If the amount of the glass fiber (b) exceeds 60% by weight, the moldability of the composition, especially the flow processability, is reduced and if the amount of the glass fiber (b) is less than 5% by weight, the desired reinforcing effect is reduced; in each case, good results are not obtained. The type of glass fiber used or the method of incorporating the glass fiber into the resin is not particularly critical in the present invention. Either a roving type glass fiber or a chopped strand type glass fiber can be used. From the aspect of productivity, however, it is preferred that a chopped strand type glass fiber be used. In order to minimize abrasion of the molding machine, the facility of cutting at the molding step, and adapability in mixing it is especially preferred that the fiber length of the glass fiber be about 0.4 to about 6 mm; it is sufficient if the fiber length of glass fiber in the final molded article is about 0.2 to about 2 mm. Various treated glass fibers now marketed can be used in the present invention.

The specific organic carboxylic acid metal salt (e) used in the present invention functions as a crystal nucleating agent for the polyethylene terephthalate-type resin. This component is a salt of an organic carboxylic acid with a metal of Group Ia and IIa of the Periodic Table. Either aliphatic carboxylic acids or aromatic carboxylic acids as the organic carboxylic acid may be used.

Specific examples of organic carboxylic acid metal salts include sodium laurate, potassium laurate, sodium myristate, potassium myristate, sodium stearate, potassium stearate, sodium octacosanoate, potassium octacosanoate, calcium myristate, calcium stearate, sodium benzoate, potassium benzoate, calcium benzoate, potassium terephthalate, sodium terephthalate and lithium terephthalate. Among these salts, sodium stearate, sodium benzoate, potassium benzoate and lithium terephthalate are especially preferred. These specific organic carboxylic acid metal salts may be used singly or in the form of a mixture of two or more of them.

It is essential that the organic carboxylic acid metal salt should be incorporated in an amount of 0.03 to 5% by weight based on the total composition. If the amount of the salt (c) is less than 0.03% by weight, the effect of improving the heat resistance and appearance is barely attained. If the amount of the metal salt (c) exceeds 5% by weight, the molded article is brittle, and good results are not obtained.

The sorbitan derivatives that are used as component (d) in the compositions of the present invention include the esters obtained from sorbitol and an organic carboxylic acid and a polyalkylene glycol adduct of such ester compounds. All the hydroxyl groups of sorbitan need not be esterified by the organic carboxylic acid or etherified by the polyalkylene glycol, as the case may be, but some of the hydroxyl groups may be left as they are. The total number of carbon atoms in the organic carboxylic acid used for formation of the ester compound is not particularly critical, but is preferably in the range of from 3 to 30.

Specific examples of polyalkylene glycol to be added to the ester compound include polyethylene glycol, polypropylene glycol and polybutylene glycol. The number of recurring units in the polyalkylene glycol is not particularly critical, but the number of recurring units is preferably in the range of from 3 to 100.

Specific examples of the sorbitan derivative (d) ester compounds include sorbitan monostearate, sorbitan monolaurate, sorbitan monooleate, sorbitan tristearate and sorbitan trioleate, and polyoxyethylene sorbitan ester compounds such as polyoxyethylene sorbitan monostearate, polyoxyethylene sorbitan monooleate, polyoxyethylene sorbitan monolaurate, polyoxyethylene sorbitan tristearate and polyoxyethylene sorbitan trioleate. Of these polyoxyethylene sorbitan tristearate and polyoxyethylene sorbitan trioleate are especially preferred. These specific sorbitan derivatives may be used singly or in mixtures of two or more of them.

It is essential that the sorbitan derivative be incorporated in an amount of 0.1 to 20% by weight based on the total composition. If the amount of the sorbitan derivative is less than 0.1% by weight, the effect of improving the heat resistance and appearance of the molded article is virtually not achieved. If the amount of the sorbitan derivative exceeds 20% by weight, the mechanical strength of the molded article is reduced and only unacceptable results are obtained.

When incorporated into the compositions the liquid paraffin used is formed mainly of alkylnaphthenes, as for example a product obtained by highly purifying a spindle oil fraction. The solid paraffin that may be used is crystalline paraffin comprising normal paraffin; the melting point of the solid paraffin is not particularly critical but is preferably in the range of about 42° to about 60° C. A mixture of solid paraffins of different melting points may be used as well. The molecular weight of polyethylene wax is not particularly critical, but polyethylene wax having a molecular weight below about 4,000 is preferred because of the especially high effect attained. Among liquid paraffin, solid paraffin and polyethylene wax, solid paraffin is most preferred because solid paraffin exhibits the best effect of rendering uniform the appearance of the molded article.

When included in the compositions of the present invention solid paraffin, liquid paraffin and polyethylene wax may be used either singly or in the form of mixtures of two or more of them. The paraffin and/or wax component (e) should be incorporated in an amount of 0.3 to 10% by weight based on the total composition. If the amount of the component (e) is less than 0.3% by weight, the effect of rendering the appearance of the molded article uniform is low, if the amount of the component (e) exceeds 10% by weight, the mechanical strength of the molded article is reduced to an unacceptable level.

In the reinforced resin compositions of the present invention, it is important that the components (c) and (d) and, when present component (e), be added and incorporated into a glass fiber-reinforced polyethylene terephthalate resin of components (a) and (b) in one "shot". That is to say, if any of components (c), (d) and (e) are incorporated by themselves, satisfactory results are not attained.

A filler such as talc, mica, glass foil, clay or kaolin, a photostabilizer (U.V. absorber) or heat stabilizer or other conventionally used additive such as a pigment or dye may be added to the reinforced resin composition of the present invention as may be required.

According to one embodiment of the present invention, predetermined amounts of the components (a) through (d), optionally together with the component (e), are mixed, and the mixture is directly injection molded. Alternatively, the mixture is rendered molten, kneaded by an appropriate kneading machine such as an extruder, and the kneaded mixture is pelletized and subjected to injection molding or compression molding. Other molding techniques may be used as well. Molded articles having excellent properties as described above are so produced.

The compositions of the present invention will now be described in more detail with reference to the following non-limiting Examples. Unless otherwise indicated all parts and percentages are by weight.

EXAMPLES 1 THROUGH 13 AND COMPARATIVE EXAMPLES 1 THROUGH 5

The components (c), (d) and (e) of the present invention, shown in Table 1, and a chopped strand-type glass fiber (hereinafter referred to as "GF") having a fiber length of 3 mm, were all incorporated in the amounts shown in Table 1 into an ethylene terephthalate homopolymer having an intrinsic viscosity $[\eta]$ of 0.72. The polymer composition was homogeneously mixed by a V-type blender and the mixture was subsequently extruded and pelletized by using a vented melt extruder having a screw diameter of 30 mm at a cylinder temperature of 260° to 280° C.

Long strip-shaped samples having a size of 127 mm×12.7 mm×3.2 mm were produced using a screw-type injection molding machine having a capacity of 5 ounces, a screw diameter of 36 mm, a cylinder temperature of 270° C., a mold temperature of 40° C. with a molding cycle of 65 seconds. With respect to these long strip-shaped samples, the heat distortion temperature (hereinafter referred to as "HDT") was measured according to the method of ASTM D-648 ($\frac{1}{8}$", 264 psi) and the Dynstat flexural strength (hereinafter referred to as "DFS") was measured by the Dynstat method according to DIN 53452. Furthermore, the visual appearance characteristics of each sample was evaluated and reported. The results obtained are shown in Table 1.

For comparison, compositions containing components in amounts outside the scope of the present invention were molded into long strip-shaped samples in the same manner as described above. The HDT and DFS values of these samples were measured and the physical appearance was evaluated. The results obtained are shown in Table 1.

Table 1 reports the evaluation of the appearance of each sample and is indicated as follows:
X: semi-transparent even in the deep interior portion
Δ: transparent edge portion is large (the interior is whitened)
○: transparent edge portion is small (the interior is whitened)
⊙: no transparency is observed in edge portion In Table 1, the recurring unit number n of polyethylene glycol of the compound used as the component (d) is as follows:

| Compound | n |
| --- | --- |
| polyoxyethylene sorbitan trioleate | 20 |
| polyoxyethylene sorbitan monooleate | 20 |
| polyoxyethylene monooleyl ether | 30 |

From the results shown in Table 1, it will be understood that in the resin compositions of the present invention, owing to the presence of the sorbitan derivative, result in excellent heat resistance even if molding is carried out at a low mold temperature. Further the articles so molded have a uniform appearance and without substantial reduction of the strength. It will also be understood that when polyethylene glycol or alkyl ether-terminated polyethylene glycol is incorporated, as in Comparative Examples, the properties of the molded article prepared from such comparative compositions are inferior to those articles molded from the composition of the present invention.

TABLE 1

| | | Component (c) | | Component (d) | | Component (e) | | HDT | DFS | |
| --- | --- | --- | --- | --- | --- | --- | --- | --- | --- | --- |
| | GF % by Weight | Kind | % by Weight | Kind | % by Weight | Kind | % by Weight | (°C.) | (kg/cm²) | Appearance |
| Example 1 | 30 | sodium benzoate | 0.3 | polyoxyethylene sorbitan trioleate | 3.0 | solid paraffin (m.p. = 42° C.) | 2 | 210 | 1780 | ⊙ |
| Example 2 | 30 | sodium stearate | 0.3 | polyoxyethylene sorbitan trioleate | 3.0 | solid paraffin (m.p. = 42° C.) | 2 | 208 | 1730 | " |
| Example 3 | 30 | sodium benzoate | 3.0 | polyoxyethylene sorbitan trioleate | 3.0 | solid paraffin (m.p. = 42° C.) | 2 | 218 | 1600 | " |
| Example 4 | 30 | sodium benzoate | 0.3 | polyoxyethylene sorbitan monooleate | 3.0 | solid paraffin (m.p. = 42° C.) | 2 | 212 | 1700 | " |
| Example 5 | 30 | sodium | 0.3 | sorbitan | 3.0 | solid paraffin | 2 | 204 | 1800 | " |

TABLE 1-continued

| | GF % by Weight | Component (c) Kind | % by Weight | Component (d) Kind | % by Weight | Component (e) Kind | % by Weight | HDT (°C.) | DFS (kg/cm$^2$) | Appearance |
|---|---|---|---|---|---|---|---|---|---|---|
| Example 6 | 30 | sodium benzoate | 0.3 | sorbitan trioleate monooleate | 3.0 | solid paraffin (m.p. = 42° C.) | 2 | 209 | 1690 | " |
| Example 7 | 45 | sodium benzoate | 0.3 | polyoxyethylene sorbitan trioleate | 15 | solid paraffin (m.p. = 42° C.) | 2 | 221 | 1620 | " |
| Example 8 | 30 | sodium benzoate | 0.3 | polyoxyethylene sorbitan trioleate | 3.0 | liquid paraffin | 2 | 211 | 1740 | ⊙~○ |
| Example 9 | 30 | sodium benzoate | 0.3 | polyoxyethylene sorbitan trioleate | 3.0 | solid paraffin (m.p. = 60° C.) | 0.5 | 208 | 1760 | ○ |
| Example 10 | 30 | sodium benzoate | 0.3 | polyoxyethylene sorbitan trioleate | 3.0 | solid paraffin (m.p. = 60° C.) | 2 | 209 | 1730 | ⊙ |
| Example 11 | 30 | sodium benzoate | 0.3 | polyoxyethylene sorbitan trioleate | 3.0 | solid paraffin (m.p. = 60° C.) | 8 | 206 | 1640 | " |
| Example 12 | 30 | sodium benzoate | 0.3 | polyoxyethylene sorbitan trioleate | 3.0 | polyethylene wax (m.w. = 2000) | 4 | 209 | 1760 | ⊙~○ |
| Example 13 | 30 | sodium benzoate | 0.3 | polyoxyethylene sorbitan trioleate | 3.0 | — | — | 212 | 1770 | |
| Comparative Example 1 | 30 | — | — | — | — | — | — | 86 | 1910 | X |
| Comparative Example 2 | 30 | sodium benzoate | 0.3 | — | — | — | — | 107 | 1840 | Δ |
| Comparative Example 3 | 30 | — | — | polyoxyethylene sorbitan monooleate | 3.0 | — | — | 86 | 1690 | X |
| Comparative Example 4 | 30 | sodium benzoate | 0.3 | polyethylene glycol (m.w. = 1000) | 3.0 | — | — | 190 | 1500 | ○~Δ |
| Comparative Example 5 | 30 | sodium benzoate | 0.3 | polyoxyethylene monooleyl ether | 3.0 | — | — | 203 | 1460 | " |

What is claimed is:

1. A reinforced resin composition consisting essentially of:
   (a) at least 30% by weight of a linear homopolymer of ethylene terephthalate, a copolymer of ethylene terephthalate with a minor amount of another monomer copolymerizable therewith, or a blend of said homopolymer or said copolymer,
   (b) about 5 to 60% by weight of a glass fiber,
   (c) about 0.03 to 5% by weight of at least one salt of an organic carboxylic acid with a metal of Groups Ia or IIa of the Periodic Table, and
   (d) about 0.1 to 20% by weight of at least one sorbitan derivative which is an ester of an organic carboxylic acid and sorbitol or a polyalkylene glycol adduct thereof, the total amount of components (a) through (d) being 100% by weight.

2. A heat resistant reinforced resin composition consisting essentially of:
   (a) at least 30% by weight of a linear homopolymer of ethylene terephthalate, a copolymer of ethylene terephthalate with a minor amount of another monomer copolymerizable therewith, or a blend of said homopolymer or said copolymer,
   (b) about 5 to 60% by weight of glass fiber,
   (c) about 0.03 to 5% by weight of at least one salt of an organic carboxylic acid with a metal of Groups Ia or IIa of the Periodic Table,
   (d) about 0.1 to 20% by weight of at least one sorbitan derivative which is an ester of an organic carboxylic acid and sorbitol or a polyalkylene glycol adduct thereof, and
   (e) about 0.3 to 5% by weight of a liquid paraffin, a solid paraffin, a polyethylene wax or mixtures thereof, the total amount of the components (a) through (e) being 100% by weight.

3. A reinforced resin composition as claimed in claim 1 or 2, wherein the glass fiber is a chopped strand-type glass fiber.

4. A reinforced resin composition as claimed in claim 1 or 2, wherein the fiber length of the glass fiber is about 0.4 to 6 mm.

5. A reinforced resin composition as claimed in claim 1 or 2, wherein component (c) is sodium laurate, potassium laurate, sodium myristate, potasium myristate, sodium stearate, potassium stearate, sodium octacosanoate, potassium octacosanoate, calcium myristate, calcium stearate, sodium benzoate, potassium benzoate, calcium benzoate, potassium terephthalate, sodium terephthalate, lithium terephthalate or mixtures thereof.

6. A reinforced resin composition as claimed in claim 1 or 2, wherein component (c) is sodium stearate, sodium benzoate, potassium benzoate or lithium terephthalate.

7. A reinforced resin composition as claimed in claim 1 or 2, wherein the sorbitan derivative (d) is sorbitan monostearate, sorbitan monolaurate, sorbitan monooleate, sorbitan tristearate, sorbitan trioleate, polyoxyethylene sorbitan monostearate, polyoxyethylene sorbitan monooleate, polyoxyethylene sorbitan monolaurate, polyoxyethylene sorbitan tristearate or polyoxyethylene sorbitan trioleate.

8. A reinforced resin composition as claimed in claim 7, wherein the sorbitan derivative (d) is polyoxyethylene sorbitan tristearate or polyoxyethylene sorbitan trioleate.

9. A reinforced resin composition as claimed in claim 1 or 2, wherein the resin of component (a) has an intrinsic viscosity [η] of about 0.4 to 1.4.

10. A reinforced resin composition as claimed in claim 2, wherein component (e) is solid paraffin having a melting point of 42° to 60° C.

11. A reinforced resin composition as claimed in claim 2, wherein component (e) is polyethylene wax having a molecular weight lower than 4,000.

12. A reinforced resin composition as claimed in claim 2, wherein component (e) is liquid paraffin composed mainly of alkylnaphthenes obtained from a purified spindle oil fraction.

* * * * *